United States Patent
Rao et al.

(10) Patent No.: US 11,115,528 B1
(45) Date of Patent: Sep. 7, 2021

(54) CALL CONTROL SERVICE

(71) Applicant: Amazon Technologies, Inc., Seattle, WA (US)

(72) Inventors: Siddhartha Shankara Rao, Seattle, WA (US); Samuel Rislove Etler, San Francisco, CA (US); Carlin Wiegner, Sacramento, CA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 15/880,380

(22) Filed: Jan. 25, 2018

(51) Int. Cl.
*H04M 3/436* (2006.01)
*G06Q 10/06* (2012.01)
*H04M 3/493* (2006.01)

(52) U.S. Cl.
CPC .... *H04M 3/4365* (2013.01); *G06Q 10/06314* (2013.01); *H04M 3/4933* (2013.01); *H04M 3/4936* (2013.01)

(58) Field of Classification Search
CPC .......... G06Q 10/06314; H04M 3/4365; H04M 3/4933; H04M 3/4936
USPC ........................................................ 704/275
See application file for complete search history.

(56) References Cited

U.S. PATENT DOCUMENTS

| | | | | |
|---|---|---|---|---|
| 5,594,791 A * | 1/1997 | Szlam | .......... | G06Q 30/016 379/265.09 |
| 6,173,266 B1 * | 1/2001 | Marx | .......... | G10L 15/22 704/270 |
| 6,356,632 B1 * | 3/2002 | Foster | .......... | H04M 3/5233 379/265.04 |
| 7,406,515 B1 * | 7/2008 | Joyce | .......... | H04M 3/5175 379/265.01 |
| 7,552,393 B2 * | 6/2009 | Hayes-Roth | .......... | G06Q 10/109 715/753 |
| 8,577,018 B1 * | 11/2013 | Ben-Yair | .......... | H04M 3/5232 379/266.01 |
| 8,699,697 B2 * | 4/2014 | Vasquez | .......... | H04M 3/5166 379/114.13 |
| 9,648,171 B1 * | 5/2017 | Eftekhari | .......... | G06Q 30/016 |
| 9,813,559 B1 * | 11/2017 | Noble, Jr. | .......... | H04M 3/5238 |
| 9,986,076 B1 * | 5/2018 | McLaren | .......... | H04Q 11/06 |
| 9,986,092 B1 * | 5/2018 | Dirienzi | .......... | H04M 3/5232 |
| 10,075,591 B1 * | 9/2018 | Dirienzi | .......... | H04L 67/10 |
| 10,171,675 B1 * | 1/2019 | McCobb | .......... | H04M 3/527 |
| 2011/0295957 A1 * | 12/2011 | Ananthanarayanan | .......... | H04L 67/24 709/206 |
| 2012/0030682 A1 * | 2/2012 | Shaffer | .......... | H04L 65/1076 718/103 |
| 2014/0334612 A1 * | 11/2014 | Singer | .......... | H04M 3/5183 379/88.01 |

(Continued)

*Primary Examiner* — Michael Colucci
(74) *Attorney, Agent, or Firm* — Lee & Hayes, P.C.

(57) ABSTRACT

A technology is described for providing virtual call assistants and call options to identified callers. An example method may include identifying a caller and a call recipient using addressing information included in a call received at a call control service. After identifying the caller, a priority designation assigned to the caller may be obtained from an agent linking profile. An interactive agent linked to the priority designation assigned to the caller may be identified, wherein the interactive agent may be configured to provide prioritized call services. Thereafter, the interactive agent linked to the priority designation may be invoked.

20 Claims, 8 Drawing Sheets

(56) References Cited

U.S. PATENT DOCUMENTS

| | | | | |
|---|---|---|---|---|
| 2015/0264181 A1* | 9/2015 | Czachor, Jr. | ............ | H04M 3/51 |
| | | | | 379/265.13 |
| 2015/0326714 A1* | 11/2015 | Roncoroni | ........ | H04M 3/42059 |
| | | | | 379/142.06 |
| 2016/0205253 A1* | 7/2016 | Williams | ............ | H04M 3/5231 |
| | | | | 379/265.09 |
| 2016/0249401 A1* | 8/2016 | Tanaka | .................... | H04M 3/00 |
| 2018/0053114 A1* | 2/2018 | Adjaoute | ............... | G06N 3/126 |

* cited by examiner

CALL CONTROL SERVICE

BACKGROUND

Agent-assisted automation and interactive voice response (IVR) systems are types of call management technologies that automate elements of what an automated agent (e.g. a computer) may present to callers during a call using pre-recorded audio or dynamically generated audio. Agent-assisted automation and IVR can streamline a call by presenting a caller with a number of options from which a caller can choose. For example, a call flow may define how a call received at an interactive call platform may be handled using agent-assisted automation from the moment the call is received to the end of the call. A call flow may present a user with a menu of options (e.g., press 1 for voicemail, press 2 to speak to a human assistant, etc.) that can be navigated to reach a result (e.g., leave a message, talk to a person, etc.). A dynamic call flow may receive natural language input from a caller and analyze the input to determine an intent of the caller and provide the caller with an answer associated with the intent. An administrator of the interactive call platform may define a call flow to handle simple to complex call scenarios, and the call flow may be implemented using applications, scripting languages, and/or other technologies, which may be executed using the interactive call platform.

DETAILED DESCRIPTION

A technology is described for a call control service used to identify a caller and to provide prioritized call services (e.g., an interactive agent configured to provide a virtual call assistant) to the caller. The call control service may be a managed service that allows a user of the call control service to configure a virtual call assistant for use with an individual user contact or a class of user contacts. A virtual call assistant may be configured to provide computer generated dialog (e.g., conversational questions and answers) to an identified caller (e.g., a user contact) using natural language processing. The computer generated dialog may include call services (e.g., connect the call, send an instant message, schedule a meeting, leave a voicemail, etc.) directed to the identified caller.

As an illustration, a user may assign priority designations to the user's contacts and link virtual call assistants used to handle calls to the contacts based on the priority designation associated with the contact. For example, the user may create a first virtual call assistant to present a set of call options to higher priority contacts, and configure a second virtual call assistant to present a different set of call options to callers assigned a lower priority. In response to receiving a call from a contact, the call control service may be used to identify a priority assigned to the contact and identify a virtual call assistant linked to the priority designation.

A virtual call assistant may be implemented using one or more interactive agents configured to provide question and answer dialogs related to call options using natural language processing. An interactive agent may include a bot, chatbot, talkbot, or similar types of conversational computer programs. An interactive agent may be programmed to interact with a user's contacts during a phone call. As an example, a user of the call control service may configure an interactive agent to provide a caller with one or more call options using a question and answer dialog, and the interactive agent may return a call action (e.g., action identifier) linked to a call option selected by the caller to the call control service. The call control service may then initiate the call action linked to the call option by either calling another service (e.g., a calendar service) or invoking another interactive agent configured to perform the call action (e.g., a chatbot).

Figure 1:
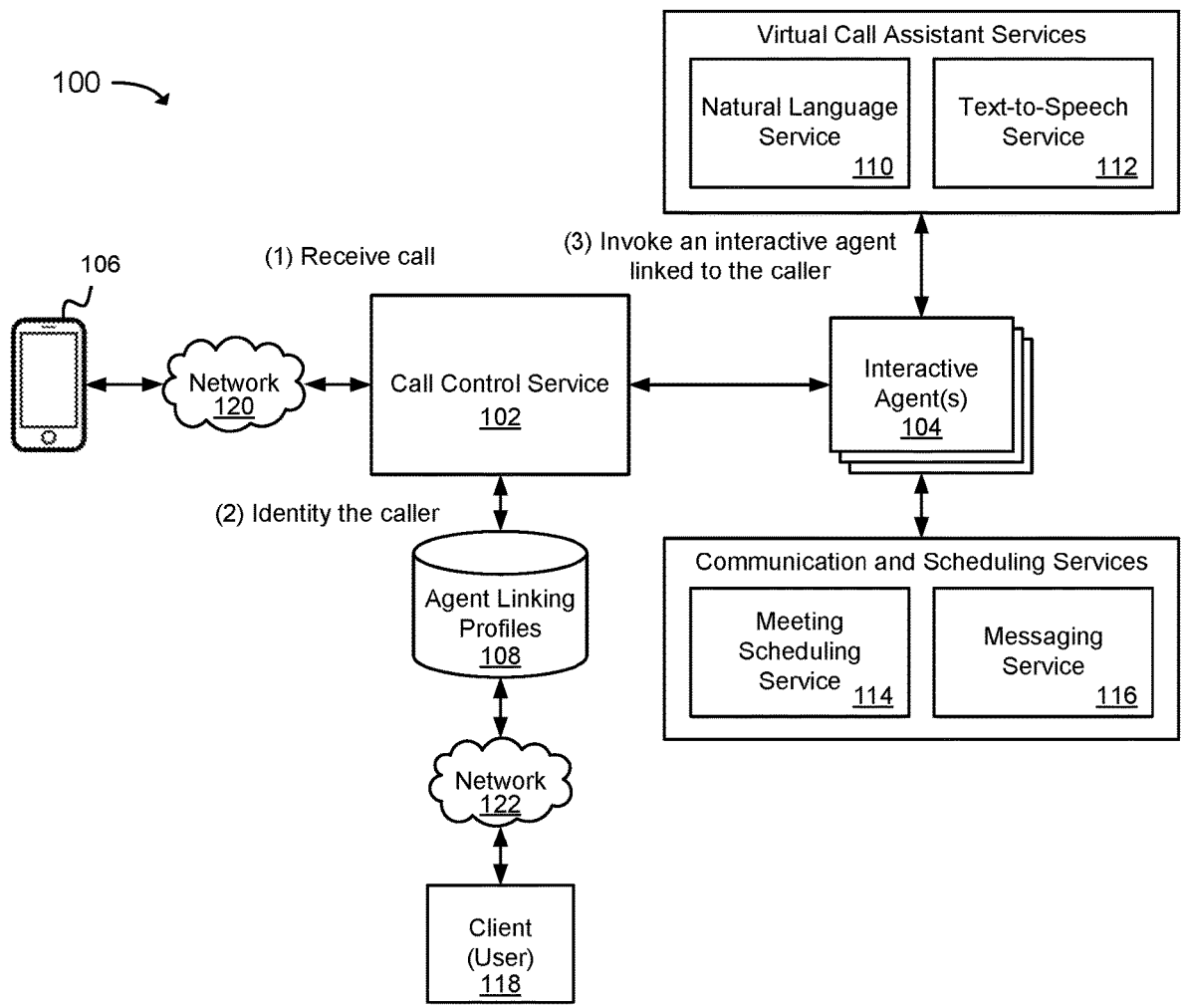
FIG. 1 is a block diagram illustrating an example system for handling calls using a call control service.

To further describe the present technology, examples are now provided with reference to the figures. FIG. 1 is a diagram illustrating a high level example of a system 100 and method for handling calls using a call control service 102. The call control service 102 may be hosted in a service provider environment (e.g., a public computing network) or a user's private data center. The call control service 102 may be configured to handle a call routed to the call control service 102 over a network 120 (e.g., a Public Switched Telephone Network (PSTN) or a Voice over Internet Protocol (VoIP) network) by using an agent linking profile 108 to identify a caller 106 and a call recipient, and an interactive agent 104 may be launched to provide the caller 106 with a virtual call assistant and call options.

As an example, in response to receiving a call, the call control service 102 may be configured to identify an agent linking profile 108 for the caller 106 using a caller identifier (e.g., a phone number or a username) and/or the user identifier (e.g., the phone number being called) and invoke an interactive agent 104 specified in the agent linking profile 108 or an interactive agent 104 that corresponds to a priority designation assigned to the caller 106 in the agent linking profile 108 of the user being called. The interactive agent 104 may take control of the call by interacting with the caller 106 to present the call options to the caller 106 and may determine an intent conveyed by the caller 106 using a natural language service 110 and a text-to-speech service 112. An intent conveyed by the caller 106 may be used to initiate an action linked to the intent (e.g., start a chat session via a messaging service 116, schedule a meeting via a meeting scheduling service 114, send to voicemail, etc.), or the intent (i.e., an intent identifier) may be returned to the call control service 102 and the intent may be used to identify a subsequent interactive agent 104 configured to handle the action linked to the intent conveyed by the caller 106. Thereafter, the interactive agent 104 may return control of the call to the call control service 102 and the call control service 102 may end the call session.

As described above, the call control service 102 may be configured to use agent linking profiles 108 to identify a caller 106 and a call recipient, and identify an interactive agent 104 assigned by the call recipient to provide a virtual call assistant to the caller 106. In one example, an agent linking profile 108 may include contact information (e.g., name, phone number, business title, etc.) and a contact priority designation that links one or more interactive agents 104 to a caller 106. In one example, contact information included in an agent linking profile 108 may be obtained from a directory, such as a company directory that includes business information for a user's contacts.

A contact priority designation may be used by the call control service 102 to identify an interactive agent 104 that corresponds to the contact priority designation assigned by the call recipient or user. As an illustration, the call control service 102 may reference an agent linking profile 108 to determine a priority designation assigned to a caller 106, and the call control service 102 may use the priority designation to identify an interactive agent 104 (or a set of interactive agents 104) associated with the priority designation assigned to the caller 106, and invoke the interactive agent 104 to provide the caller 106 with a virtual call assistant and call options personalized to callers 106 assigned the priority designation. As a specific example, an agent linking profile 108 may designate a caller 106 as a "high priority" caller and the "high priority" designation may correspond to an interactive agent 104 that has a "high priority" label. Illustratively, the interactive agent 104 may be configured to provide call options that connect a call from the caller 106 to the call recipient (e.g., a user of the call control service 102) when the call recipient is available to take the call, and provide call options to initiate a chat session with the user or schedule a follow-up call with the call recipient when the call recipient is unavailable to take the call.

In another example, an agent linking profile 108 may include a direct link (e.g., an endpoint address, an interactive agent identifier, a URI (uniform resource identifier), etc.) to an interactive agent 104 assigned to a contact (e.g., a caller 106). For example, a user of the call control service 102 may include a direct link to an interactive agent 104 in an agent linking profile 108, and the call control service 102 may use the link to invoke the interactive agent 104, providing a virtual call assistant and call options to a caller 106 associated with the agent linking profile 108. Illustratively, a user may personalize an interactive agent 104 for a caller and include a link to the interactive agent 104 in the caller's agent linking profile 108 for a user, and the call control service 102 may use the caller's agent linking profile 108 to identify the interactive agent 104 assigned to the caller 106. As a specific example, the interactive agent 104 may provide the caller with a virtual call assistant and an instant message option that allows the caller to instant message the user (via a messaging service 116) when the user is unable to answer a call. In response to receiving a call from the caller, the call control service 102 may reference the associate's agent linking profile 108 to obtain the link to the interactive agent 104 and invoke the interactive agent 104, thereby providing the caller with the virtual call assistant and the instant message option.

A user of the call control service 102 may create agent linking profiles 108 for callers 106 (via a client 118 over a network 122), and register the agent linking profiles 108 with the call control service 102. In one example, a user may register or upload a contact directory to the call control service 102. The contact directory may include contact information (e.g., name, phone number, business title, etc.) for the user's contacts and the contact information may be used to create agent linking profiles 108 for the user's contacts. The user may augment an agent linking profile 108 to include a priority designation assigned to a contact or to include a direct link to an interactive agent 104.

In one example, a user may create an interactive agent 104 (or a set of interactive agents 104) for use with the user's contacts and register the interactive agent 104 with the call control service 102. As described later in association with FIGS. 2 and 3, an interactive agent 104 may be hosted in a service provider environment, which may include a content designer user interface (shown in FIG. 2) that provides tools for creating an interactive agent 104, or an interactive agent 104 may be hosted in a user's private data center. A user may register an endpoint or host for the interactive agent 104 with the call control service 102, where the endpoint may be for a network host (e.g., a server or computing instance) which hosts the interactive agent 104. The call control service 102 may use the endpoint or host to invoke the interactive agent 104 as part of handling a call from the user's contacts.

After registering an interactive agent 104 with the call control service 102, or selecting an interactive agent 104 provided with the call control service 102, a user may associate the interactive agent 104 with one or more of the user's contacts. For example, a user may link a priority label with an interactive agent 104 that associates the interactive agent 104 with a priority designation assigned to a contact in an agent linking profile 108. As an illustration, a user may assign a "high priority" label to an interactive agent 104 and the interactive agent 104 may be used to provide a virtual call assistant and call options to contacts assigned a "high priority" designation. Also, a user may directly associate an interactive agent 104 with a contact by including an identifier (e.g., an endpoint or host identifier) for the interactive agent 104 in an agent linking profile 108, as described earlier.

In another example, a service provider of the call control service 102 may provide users with a catalog of interactive agents 104 available to the user to associate with the user's contacts. The interactive agents 104 offered by the service provider may provide a user with a selection of virtual call assistants configured to interact with a caller 106 using various combination of voices, languages, and call options that allow a user to personalize a virtual call assistant to a caller 106. In another example, a service provider may provide users with an interactive agent template (not shown) that a user can modify to the user's specifications and assign to the user's contacts.

In the past, users of agent-assisted automation and/or interactive voice response systems have not had the option to personalize a menu of options provided through the systems to individual callers using priority designations assigned to the callers. For example, a user could configure an interactive voice response system with menu options and/or call flows that generally applied to any caller, but the user did not have the ability to configure the interactive voice response system with menu options and/or call flows directed to one or more specific users. As a result of the present technology, a user of a call control service 102 may personalize a call experience to individual callers 106. For example, using the present technology described above, a user of the call control service 102 may configure an interactive agent 104 to provide personalized menu options and call flows to one or more callers 106 using the priority designation assigned to the callers, and the interactive agent 104 may be registered with the call control service 102. Thereafter, the call control service 102 may invoke the interactive agent 104 when a call is received from a caller 106 associated with the priority designation.

Figure 2:
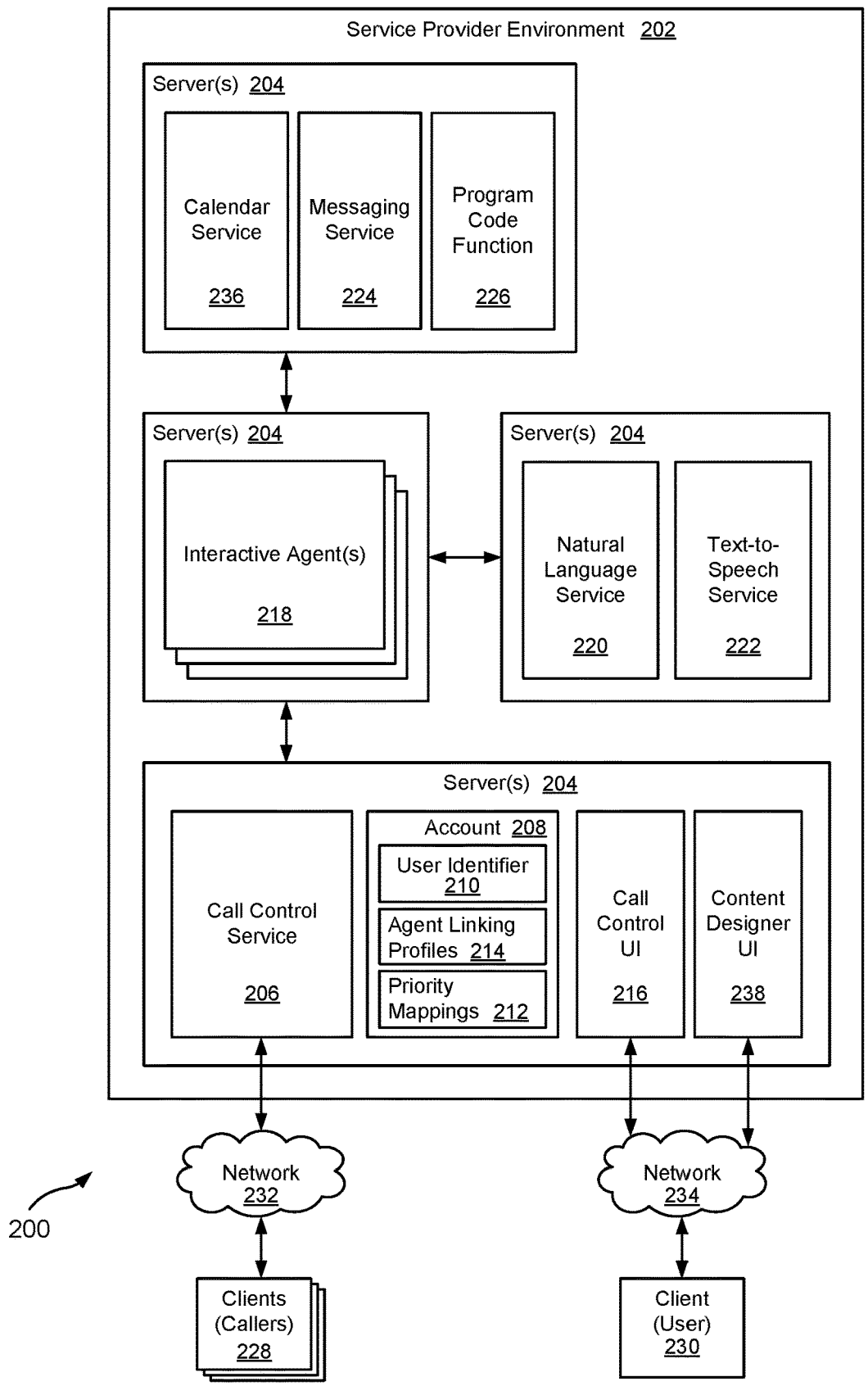
FIG. 2 is a block diagram that illustrates various example components included in a system for providing prioritized call services to user contacts.

FIG. 2 illustrates components of one example system environment 200 on which the present technology may be executed. The system environment 200 may include servers 204 in a service provider environment 202 that host various managed services used by a user of a call control service 206 to provide prioritized call services to the user's contacts. In one example, the service provider environment 202 may include computing resources for executing computing instances (e.g., virtual machines), which may be an instance of a software implementation of a machine (i.e. a computer) configured to emulate a physical machine, as described in greater detail in association with FIG. 10. Various components of the system environment 200 may be implemented on one or more computing instances.

As illustrated, the system environment 200 may include a call control service 206 in network connection with a plurality of clients 228. A client 228 may include any device capable of sending and receiving voice data over a network 232, such as a Public Switched Telephone Network (PSTN) or a Voice over Internet Protocol (VoIP) network. For example, a client 228 may include a processor-based device such as, but not limited to a telephone device, cellphone device, smartphone, tablet computer, laptop or notebook computer, desktop computer, game console, smart TV, voice controlled hub, or other devices with like voice data capability. A client 228 may be used to initiate a call (e.g., a telephone call, Voice over IP call, or video call) and the call may be routed over the network 232 to the call control service 206. Calls originating from a PSTN may be routed to a VoIP network using a VoIP media gateway controller.

A call routed to the call control service 206 may include addressing information used to identify a source of the call and a destination of the call. For example, a call received at the call control service 206 may include a data record (e.g., call detail record (CDR)) generated by a telephone exchange or other telecommunications equipment that includes addressing information. The data record may contain call metadata that includes a source number, destination number, username, URI (Uniform Resource Identifier), as well as other call metadata. Also, a call originating from a VoIP network may include addressing information in the packet headers of IP packets received at the call control service 206.

The call control service 206 may be configured to use addressing information included with a call to identify a caller and a call recipient. A user of the call control service 206 may create a user account 208 that includes a user identifier 210 (e.g., a phone number and/or username) for the user, and agent linking profiles 214 for the user's contacts. An agent linking profile 214 may include a contact's phone number, username, and/or another call routing identifier used to route a call to the call control service 206. The call control service 206 may use the user account 208 to identify the caller and the call recipient of a call received at the call control service 206. For example, in response to receiving a call at the call control service 206, destination identifier (e.g., a destination phone number) included in the call may be used to identify a user account 208 that corresponds to the destination identifier (e.g., a destination phone number), and retrieve an agent linking profile 214 from the user account 208 that corresponds to source identifier (e.g., a source phone number) included in the call.

Also, a user may add a priority designation to an agent linking profile 214 used to identify an interactive agent 218, or the user may add a direct link for an interactive agent 218 to an agent linking profile 214. The call control service 206 may use a priority designation or a link (e.g., endpoint identifier or address) obtained from the agent linking profile 214 to identify and invoke an interactive agent 218 assigned to provide a virtual call assistant, call options, and/or services to the contact associated with the agent linking profile 214. For example, the call control service 206 may map a priority designation assigned to an agent linking profile 214 to an interactive agent 218 using a priority mapping 212 created by a user.

A call control UI (User Interface) 216 may be provided to users (via a client 230 and network 234) who may use the call control UI 216 to create a user account 208, manage agent linking profiles 214 and other information included in the user account 208, and create priority mappings 212 that map a priority designation assigned to an agent linking profile 214 to an interactive agent 218. In one example, a user may use the call control UI 216 to link a calendar (via a calendar service 236) to a user account 208, and the calendar may be used to determine whether the user is available to receive a call. For example, the call control service 206 may be configured to reference a user's calendar via a calendar service 236 to determine whether the user may be available for a later meeting, may be in a meeting, at an appointment, or has blocked off time to be undisturbed.

An interactive agent 218 (e.g., a conversational computer program such as, a bot, chatbot, talkbot, or the like) may be configured to provide a caller with a virtual call assistant configured to provide call options and services related to the call options. For example, an interactive agent 218 may be configured to greet a caller, explain call options to the caller, and determine a call option selected by the caller. Also, an interactive agent 218 may be used to provide an interface to additional services related to call options, such as a messaging service 224, a calendar service 236, or other managed services.

As one example, an interactive agent 218 may interface with the messaging service 224 in order to send a message (e.g., an instant message, SMS message, MMS message, email message, and the like) to a call recipient. For example, the interactive agent 218 may send speech data received from a client 228 (e.g., a caller) to the natural language service 220. The natural language service 220 may convert the speech data to text and may return the text to the interactive agent 218. The interactive agent 218 may then send the text to the messaging service 224 which sends the message to the call recipient. In the case that the call recipient responds to the message sent by the caller, the messaging service 224 may send the message to the interactive agent 218, which interfaces with the text-to-speech service 222 to convert the text of the message to synthesized speech, and the interactive agent 218 may send the synthesized speech to the caller via a client 228.

As another example, an interactive agent 218 may interface with the calendar service 236 in order to schedule a meeting in response to the caller selecting a call option to schedule a time for a follow-up call. For example, the interactive agent 218 may prompt a caller for a proposed meeting time, obtain a meeting calendar for the call recipient from the calendar service 236, and reference the meeting calendar to determine whether the call recipient may be available during the meeting time. In the case that the meeting calendar indicates that the call recipient is available during the meeting time, the interactive agent 218 may, via the calendar service 236, add an invitation for the meeting time to the meeting calendar.

In one example, a meeting time provided to a caller may be determined based on the priority designation of the caller. For example, a user (e.g., call recipient) may indicate meeting times that are available based on a priority designation assigned to a contact. As an illustration, first available meeting times may be made available to high priority contacts, whereas lower priority contacts may be provided with meeting time that are scheduled at the end of the work day.

In one example, an interactive agent 218 may be used to prompt a caller for information related to a call, and the information may be evaluated to determine a priority of the call used to identify one or more call options that may be provided to the caller. As an illustration, a user may designate calls associated with a particular work project as high priority, and the high priority designation may be linked to call options for connecting the call to the user or sending an instant message to the user. As a result, a caller may respond to a prompt for the purpose of the call with a work project identifier (e.g., a name of the work project) and the caller may be provided with the call options that connects the call or sends an instant message to the call recipient. In another example, information related to a call may be linked directly to one or more call options. For example, continuing the illustration above, a user may link a particular work project (e.g., a work project identifier) to call options for connecting the call to the user or sending an instant message to the user.

In one example, an interactive agent 218 may be used to invoke computing services. For example, an interactive agent 218 may be configured to launch program code function 226 used to perform a function or service. Illustratively, an instance of a program code function 226 may include a segment of program code that may be like a function, and the program code may receive parameters, perform processing, and provide return values.

Serverless computing services may be used to execute the instances of program code function 226 on a program code compute service. Serverless computing services may comprise a platform for services that execute an instance of program code function 226 on a computing instance hosted in a program code compute service of a service provider environment as described in relation to FIG. 10. That is, the program code function 226 may execute on a computing instance or in a software container (e.g., an isolated environment containing dependencies for executing the program code function) that executes code in response to requests to run the program code function 226 (e.g., a request from an interactive agent 218), and automatically manages compute resources used by program code function 226. Once an instance of program code function 226 has been executed and results have been returned, the instance of the program code function 226 and results may be removed from computer memory allocated to a computing instance or software container used to execute the program code function 226.

In one example, a set of interactive agents 218 may be used to provide a virtual call assistant. For example, each interactive agent 218 included in a set interactive agents 218 may be configured to handle an individual task and then transfer control to a subsequent interactive agent 218 or back to the call control service 206. As an illustration, a first interactive agent 218 may prompt a caller for a response (e.g., select a call option), determine an intent based on the response (e.g., selected instant message option), and return an action (start instant message session) linked to the intent to the call control service 206, and the call control service 206 may identify a second interactive agent 218 associated with the action and invoke the second interactive agent 218 configured to handle the action (e.g., initiate and control the instant message session).

An interactive agent 218, in one example, may be implemented using a data-exchange format file, such as a JSON (JavaScript Object Notation) file or XML (eXtensible Markup Language) file, that includes instructions (computer code) configured to interface with a natural language service 220 and a text-to-speech service 222 to provide the functionalities of a virtual call assistant. The text-to-speech service 222 may be a managed service provided by a service provider. The text-to-speech service 222 may be configured to convert input text into synthesized speech and provide the synthesized speech in speech audio data, which may include a speech audio file or a speech audio stream. The natural language service 220 may also be a managed service provided by the service provider. The natural language service 220 may be configured to provide automatic speech recognition (ASR) functionalities for converting speech to text, and natural language understanding (NLU) used to recognize the intent of the text, enabling an interactive agent 218 to provide a caller with conversational interactions. In one example, the natural language service 220 may be used to convert speech to text, and the text may be input to the text-to-speech service 222 to generate speech audio data. As an illustration, an interactive agent 218 may be configured to prompt a caller (e.g., present a call option or ask a question) by obtaining speech audio data via an API (Application Programming Interface) from the text-to-speech service 222 and cause the speech audio data to be transmitted over the network 232 to a client 228 for output to a caller. The caller may respond to the prompt (e.g., select a call option or answer a question) and speech audio data transmitted over the network 232 may be received by the interactive agent 218 and the speech audio data may be sent via an API to the natural language service 220 for automatic speech recognition and natural language understanding to recognize the intent of the speech audio data. In the case that the intent of the speech audio data correlates to a call option, the interactive agent 218 may transfer control of the call back to the call control service 206 for execution of an action linked to the call option.

Users of the call control service 206 may use a content designer UI 238 to create one or more interactive agents 218 that provide virtual call assistants for the users' contacts. The content designer UI 238 may be made available to users via a client 230 and a network 234. The content designer UI 238, in one example, may provide users with a visual tool for creating and displaying interactive agent files and editing the interactive agent files. The content designer UI 238 may provide a drag-and-drop interface, drop down fields, and menus for adding and modifying interactive agent files. The content designer UI 238 may be configured to modify an underlying file (e.g., a JSON file) in response to changes made to an interactive agent 218 using the visual tools included in the content designer UI 238.

The network 234 may include any useful computing network, including an intranet, the Internet, a local area network, a wide area network, a wireless data network, or any other such network or combination thereof. The various processes and/or other functionality contained within the system environment 200 may be executed on one or more processors that are in communication with one or more memory modules. The system environment 200 may include a number of computing devices that are arranged, for example, in one or more server banks or computer banks or other arrangements. The computing devices may support a computing environment using hypervisors, virtual machine monitors (VMMs) and other virtualization software. The services described in relation to FIG. 2 may communicate with other services, modules, and clients using API calls, procedure calls, or other network commands.

Figure 3:
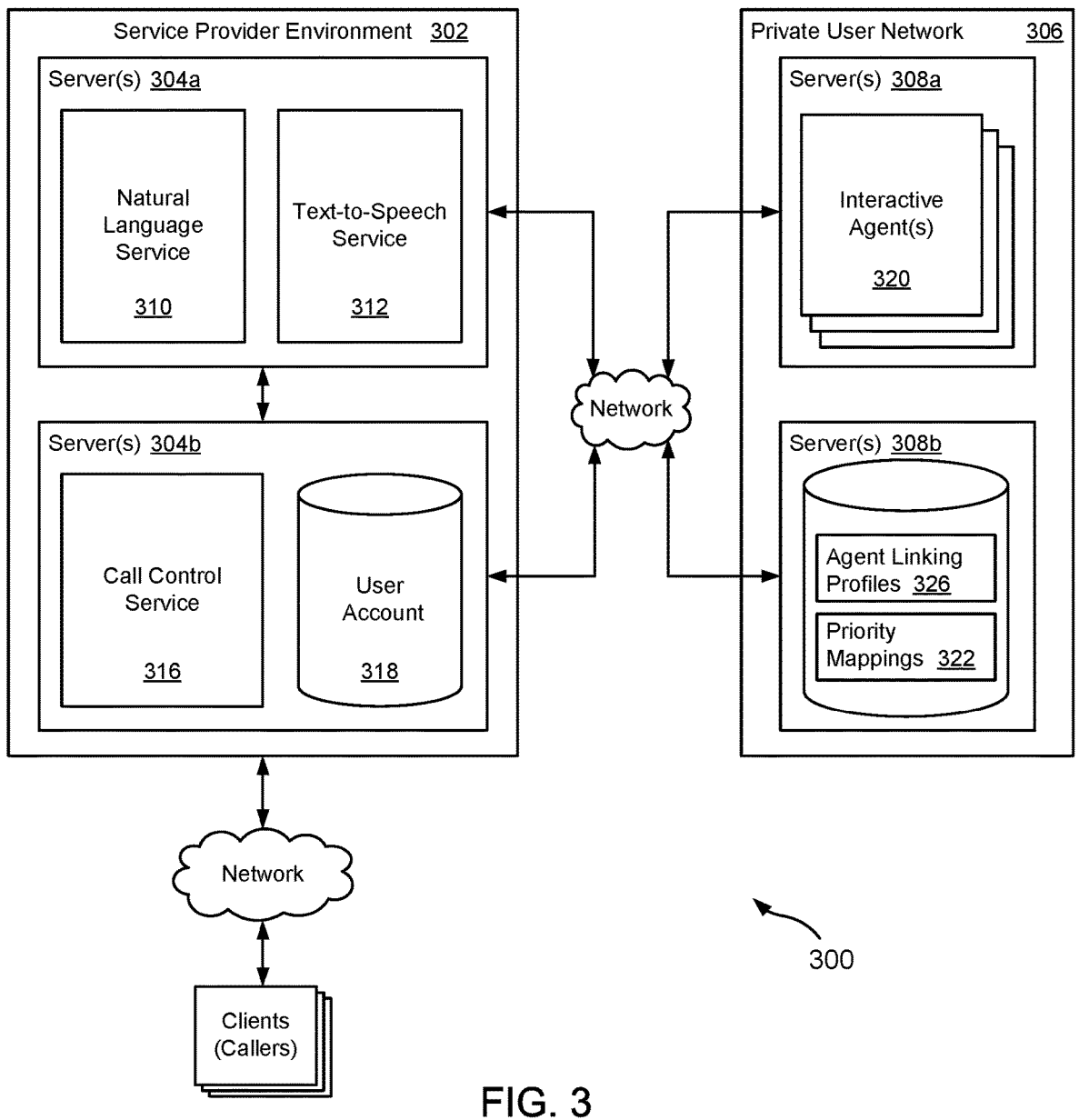
FIG. 3 is a block diagram that illustrates an example system for handling calls distributed between a service provider environment and a private user network.

FIG. 3 illustrates components of an example system 300 distributed between a service provider environment 302 and a private user network 306. Illustratively, a service provider may make a call control service 316 and related services available to a user, while allowing the user to maintain the user's own call control resources (interactive agents 320 and agent linking profiles 326) in the private user network 306.

As illustrated, the service provider environment 302 (e.g., a public computing environment) may include servers 304a-b used to host a call control service 316 and other services provided by a service provider. The private user network 306 may include servers 308a-b used to host a user's interactive agents 320 and user data (e.g., agent linking profiles 326), which the user may make available to the call control service 316 in order to provide the user's contacts with personalized virtual call assistants. In one example, a private user network 306 may be located in a data center on the user's premises. In another example, the private user network 306 may be located in a virtual private network, which in some examples may be hosted within a service provider environment 302.

A user may register a user account 318 with the call control service 316 and the call control service 316 may use the user account 318 to associate received calls with the user. For example, the user account 318 may include a user's phone number, username, and/or another call routing identifier, which may be mapped to a call received at the call control service 316. The user account 318 may include references (e.g., endpoint addresses, host addresses, or host identifiers) to call control resources and user data located in the private user network 306. For example, the user account 318 may include links to interactive agents 320 and agent linking profiles 326.

The call control service 316 may map a received call to a user account 318 using a destination identifier (e.g., a destination phone number) included with the call that matches a call routing identifier included in the user account 318. The call control service 316 may obtain a link to the user's agent linking profiles 326 from the user account 318. The call control service 316 may use the link to reference the user's agent linking profiles 326 located in the user environment and to identify an agent linking profile 326 that includes a call routing identifier (e.g., phone number) that maps to a source identifier (e.g., source phone number) included with the call.

After identifying the agent linking profile 326, the call control service 316, in one example, may reference the agent linking profile 326 to determine a priority designation assigned to a contact associated with the agent linking profile 326 and identify an interactive agent 320 associated with the priority designation using a priority mapping 322. In another example, the call control service 316 may reference the agent linking profile 326 to obtain a direct link (e.g., an endpoint address) to an interactive agent 320 assigned to the contact. The call control service 316 may invoke the interactive agent 320 located in the private user network 306 using the link to the interactive agent 320. The interactive agent 320 may be configured to interface with a natural language service 310 and a text-to-speech service 312 hosted in the service provider environment 302 in order to provide the functionalities of a virtual call assistant to a caller.

The service provider environment 302 and the private user network 306 may include data stores used to store user accounts 318, agent linking profiles 326, and/or priority mappings 322. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

FIGS. 2 and 3 illustrate that certain processing may be performed using services. In one example configuration, a service with one or more processes may execute on a server or other computer hardware. Such services may be centrally hosted functionality, and a service application may receive requests and provide output to other services or consumer devices. For example, services may be considered on-demand computing that are hosted in a server, virtualized service environment, grid or cluster computing system. An API may be provided for services to enable a second service to send requests to and receive output from the first service. Such APIs may also allow third parties to interface with the service and make requests and receive output from the services. The API calls, procedure calls, or other network commands that may be made in relation to the services may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services. While FIGS. 2 and 3 illustrate example systems that may implement the techniques above, many other similar or different environments are possible. The example system environments discussed and illustrated above are merely representative and not limiting.

Figure 4:
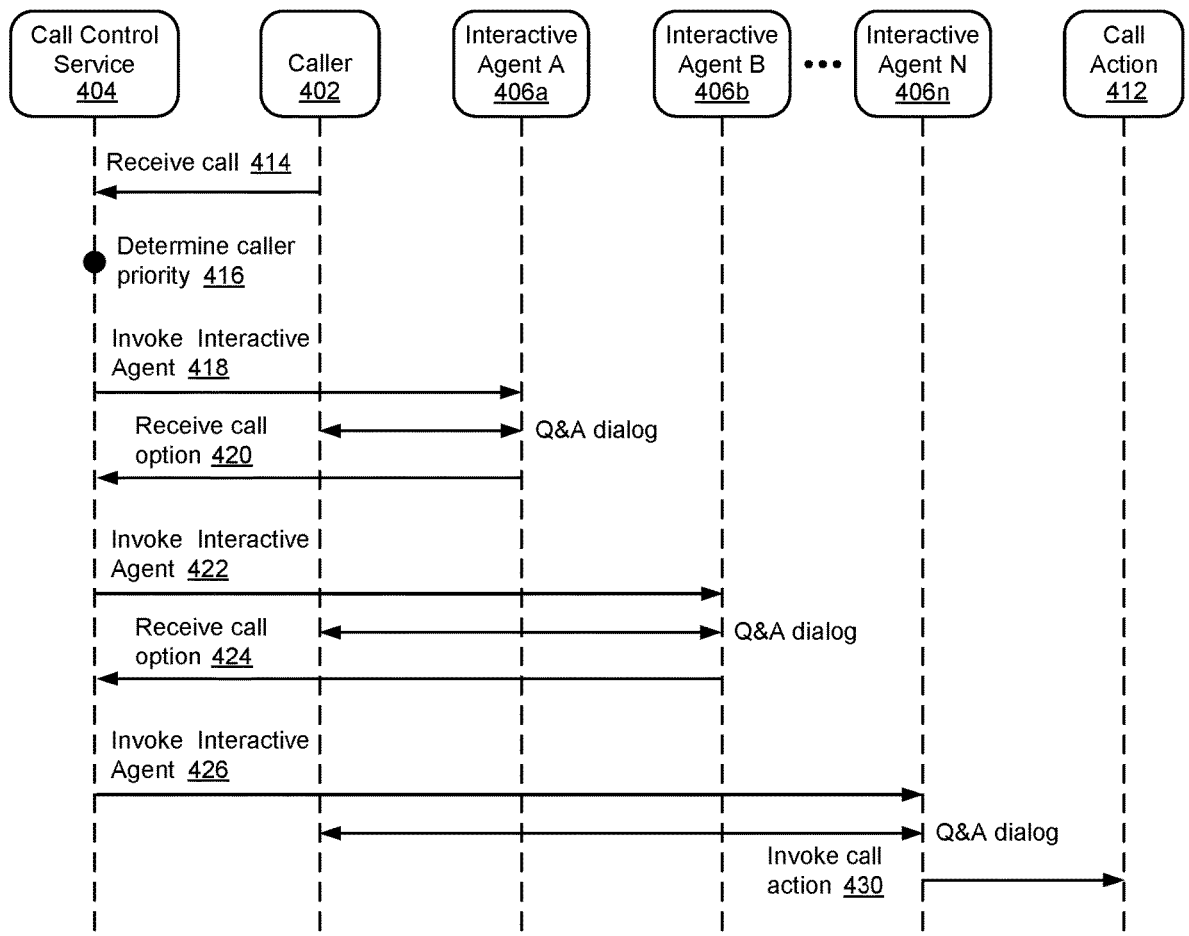
FIG. 4 is a sequence diagram illustrating an example method for handling a call received at a call control service.

FIG. 4 is a sequence diagram illustrating an example method for handling a call received at a call control service 404. In response to receiving a call 414, the call control service 404 may identify a caller 402 and a call recipient associated with the call, and determine a priority of the caller 416, for example, by referencing an agent linking profile to obtain a priority designation assigned to the caller by the call recipient. Illustratively, a priority designation assigned to a contact (e.g., the caller 402) may be binary (e.g., priority or non-priority) or may include a range of priorities (e.g., high, mid, low priority, or a numerical ranking). As will be appreciated, other ranking techniques may be used to indicate an importance of a contact associated with a call received at the call control service 404.

In one example, a determination whether the call recipient is available to receive the call may be made. In one example, the determination may be made by referencing a meeting calendar associated with the call recipient to determine whether the call recipient may be in a meeting. In another example, the determination may be made by referencing a communications channel (e.g., a phone line, video conferencing channel, etc.) associated with the call recipient to determine whether the communications channel is being utilized (e.g., whether the phone line is being used) indicating that the call recipient may not be available to receive the call. In yet another example, the determination may be made by referencing a "do not disturb" status set by the call recipient indicating that the call recipient is unavailable to receive calls from contacts assigned specified priority designations. For example, the call control service 404 may include a "do not disturb" feature that allows a user to specify calls associated with contacts assigned a priority designation to send to a virtual call assistant associated with the priority designation.

The call control service 404 may use the priority designation assigned to the caller 402 to identify one or more interactive agents 406*a-n* associated with the priority designation. The interactive agents 406*a-n* may provide the caller 402 with a virtual call assistant configured for contacts assigned the priority designation. For example, a user of the call control service 404 may personalize virtual call assistants and call options to individual contacts, or to a class of contacts. As an example, a user may configure interactive agents 406*a-n* to provide a virtual call assistant for high level associates (e.g., president, vice president, etc.), a second virtual call assistant for mid-level associates (e.g., manager, supervisor, etc.), and a third virtual call assistant for low-level associates (e.g., coworkers, staff, etc.). The user may associate each virtual call assistant with a priority (e.g., high-level, mid-level, and low-level priorities) that corresponds to priority designations assigned to the user's contacts via agent linking profiles.

The interactive agent 406*a* may be configured to provide call options that correspond to an importance of the caller 402. For example, call options that allow a caller 402 to contact a call recipient via an alternative channel of communication (e.g., instant message, SMS, MMS, etc.) may be provided to higher priority callers, and call options that allow a caller 402 to schedule a follow-up call may be provided to lower priority callers. The interactive agents 406*a-n* may be configured to generate dialog (e.g., questions and answers) by providing information (e.g., call option information) and asking questions (e.g., ask caller to choose a call option).

After identifying one or more interactive agents 406*a-n* associated with the priority designation, the call control service 404 may invoke the interactive agent(s) 406*a-n*. In the example illustrated in FIG. 4, a sequence of interactive agents 406*a-n* may be invoked to provide a caller 402 with a virtual call assistant and invoke a call action 412 specified by the caller 402.

As a non-limiting example, a first interactive agent 406*a* invoked 418 by the call control service 404 may be configured to greet the caller 402 with a message indicating that the call recipient is unavailable to take the call and present the caller 402 with available call options. The interactive agent 406*a* may be used to determine call options the caller 402 selects. For example, the interactive agent 406*a* may determine an intent contained in a response to a prompt and identify a call option linked to the intent. As an illustration, in response to a prompt for a call option, the caller 402 may say the phrase "send a message to Jeff", and the interactive agent 406*a* may analyze the phrase and determine that the intent of the phrase is to send a message to the call recipient and identify a send message option linked to the intent.

After identifying a call option selected by the caller 402, the first interactive agent 406*a* may return a call option 420 identifier to the call control service 404. In response, the call control service 404 may identify a second interactive agent 406*b* associated with the call option identifier and invoke 422 the second interactive agent 406*b* configured to handle the call option selected by the caller. Continuing the illustration above, the second interactive agent 406*b* may be used to prompt the caller 402 for a type of message to send to the call recipient and determine an intent in the caller's response to the prompt. For example, the caller may say the phrase "send an instant message" and the second interactive agent 406*b* may identify that the intent of the phrase is to send an instant message to the call recipient, and return a call option identifier 424 to the call control service 404 for sending an instant message.

In response, the call control service 404 may identify a third interactive agent 406*n* associated with the call option identifier to send the instant message and invoke 426 the third interactive agent 406*n*. The third interactive agent 406*n* may be used to prompt the caller 402 for the contents of the instant message and invoke 430 a call action 412 linked to the call option by interfacing with an instant message service to send the instant message to the call recipient's instant message account. As will be appreciated, the example sequence illustrated in FIG. 4 is merely representative of one example for providing a virtual call assistant to a caller 402 and is not meant to be limiting.

Figure 5:
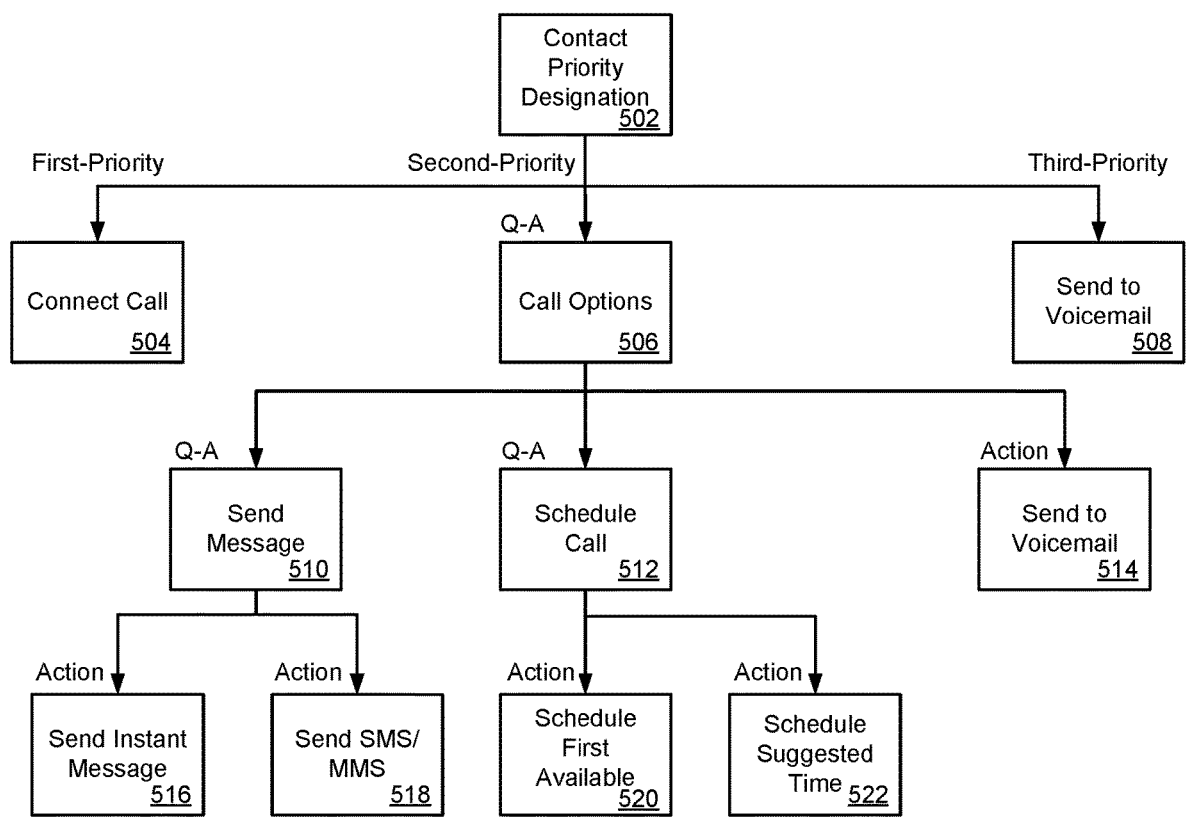
FIG. 5 illustrates an organization of call options according to priority designations assigned to contacts of a user of a call control service.

FIG. 5 illustrates an organization of call options according to priority designations assigned to contacts of a user of a call control service. As illustrated, the call control service may be used to determine a contact priority designation 502 assigned by a user, and the priority designation may be used to identify a virtual call assistant that provides call options to a contact. A contact assigned a first-priority may be provided with a call option that connects the call 504 to the user. A contact assigned a second-priority may be provided with a number of call options 506 via question and answer dialog generated by a virtual call assistant. And a contact assigned a third-priority may be provided with a call option that sends the contact to the user's voicemail 508.

An option provided to a contact assigned the second-priority may include an option to send a message 510 to the user, as described later in association with FIG. 7. In response to selecting this option, the contact may be presented with an option to send an instant message 516 to the user or send an SMS or MMS message to the user 518. Another option provided to a contact assigned the second-priority may include an option to schedule a call 512 with the user, as described later in association with FIG. 8. In response to selecting this option, the contact may be presented with an option to schedule a first available time slot 520 with the user, or schedule a suggested time slot 522 with the user. Also, contact assigned the second-priority may select an option to be sent to the user's voicemail 514.

Figure 6:
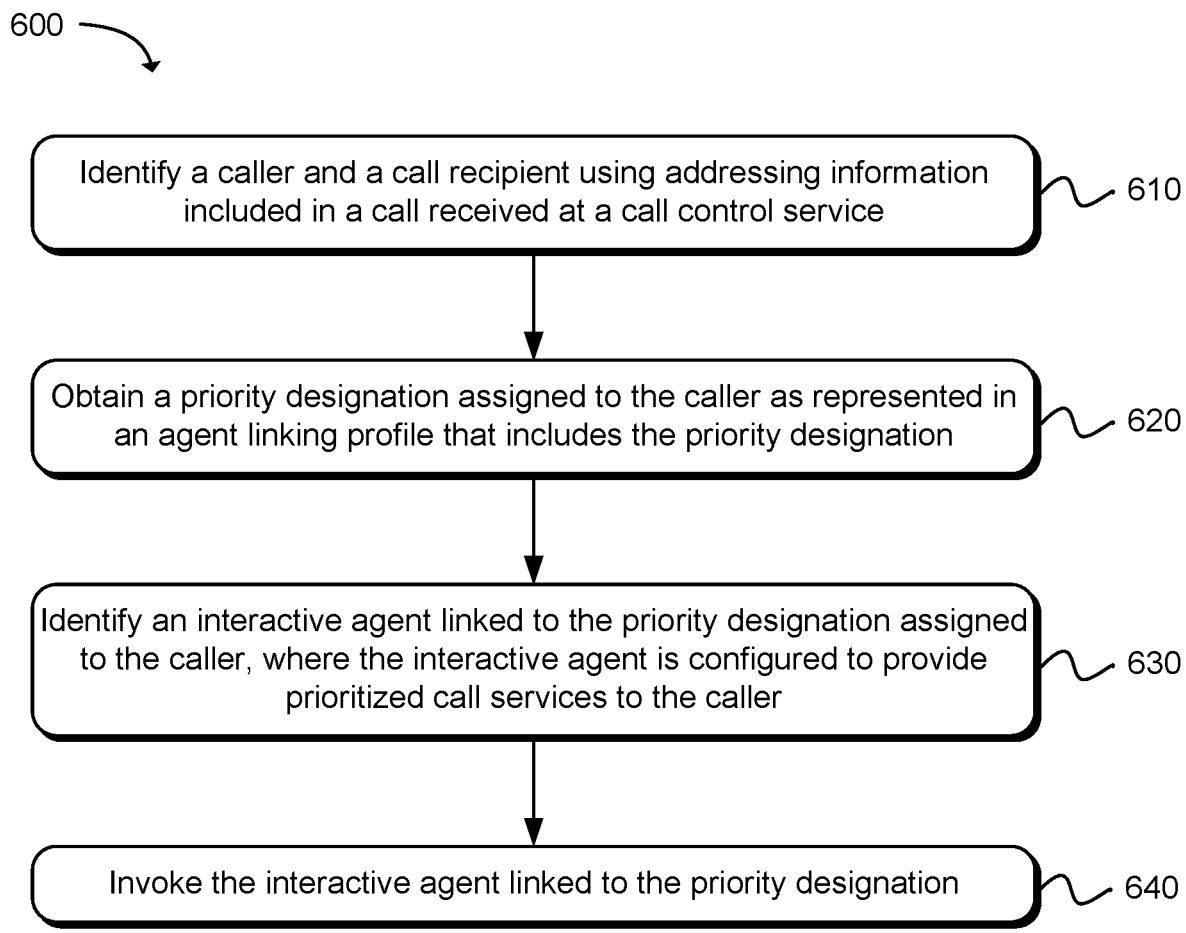
FIG. 6 is a flow diagram that illustrates an example method for providing virtual call assistants and call options to identified callers using a call control service.

FIG. 6 is a flow diagram that illustrates an example method 600 for providing virtual call assistants and call options to identified callers using a call control service. Starting in block 610, in response to receiving a call at a call control service, a caller and a call recipient may be identified using addressing information included in a call. Illustratively, a user account for a user of the call control service may be identified. The user account may include agent linking profiles for the user's contacts, which may be used to identify the caller and the call recipient.

In one example, a determination whether the call recipient is available to receive the call may be made by referencing a meeting calendar associated with the call recipient, or referencing a communications channel associated with the call recipient to determine whether the communications channel is being utilized indicating that the call recipient may not be available to receive the call, or determining that the call recipient is unavailable to receive calls associated with a specified priority designation by referencing a "do not disturb" status set by the call recipient indicating calls associated with a priority designation to send to a virtual call assistant.

As in block 620, a priority designation assigned to the caller may be obtained. The priority designation may be obtained from agent linking profile that includes the priority designation. In one example, the agent linking profile may include priority designations associated with a caller as obtained from a directory. For example, a directory may include a company directory that includes business titles for a user's contacts. A business title may be obtained from the business directory and the business title may be associated with a priority designation.

As in block 630, an interactive agent linked to the priority designation assigned to the caller may be identified. The interactive agent may be configured to provide prioritized call services to the caller. The prioritized call services may include virtual call assistants and call options linked to priority designations. More specifically, interactive agents configured to provide call service dialogs and call options may be linked to priority designations assigned to callers (e.g., user contacts). An interactive agent may be hosted in a service provider environment, a private user network, or a user data center located on user premises. The interactive agent may be configured to provide a call option and dialog (e.g., conversational questions and answers) to the caller using a natural language service and to initiate a call action linked to the call option. As one example, the interactive agent may be configured to send a message to the call recipient in response to the caller selecting a call option to exchange messages using the interactive agent. As another example, the interactive agent may be configured to schedule a meeting in response to the caller selecting a call option to schedule a time for another call. As another example, the interactive agent may be configured to prompt the caller for information related to the call (e.g., the purpose of the call), evaluate the information to determine a call action (e.g., determine based on the purpose of the call whether to put the call through to the call recipient), and initiate the call action (e.g., send the call to the call recipient).

As in block 640, the interactive agent linked to the priority designation may be invoked. In one example, the call control service invokes the interactive agent using an API (Application Programming Interface) or a program code function. In one example, control of the call may be transferred to the interactive agent. The interactive agent may handle the call by providing the call options and automated dialog associated with the call options to the caller using the natural language service, and return control of the call to the call control service. In one example, the interactive agent may return a call status to the call control service. The call status may indicate a call action to perform, such as invoking a subsequent interactive agent, or invoking a service (e.g., messaging service or scheduling service), or the call status may indicate that the call has ended, whereupon the call control service may terminate a call session for the call.

Figure 7:
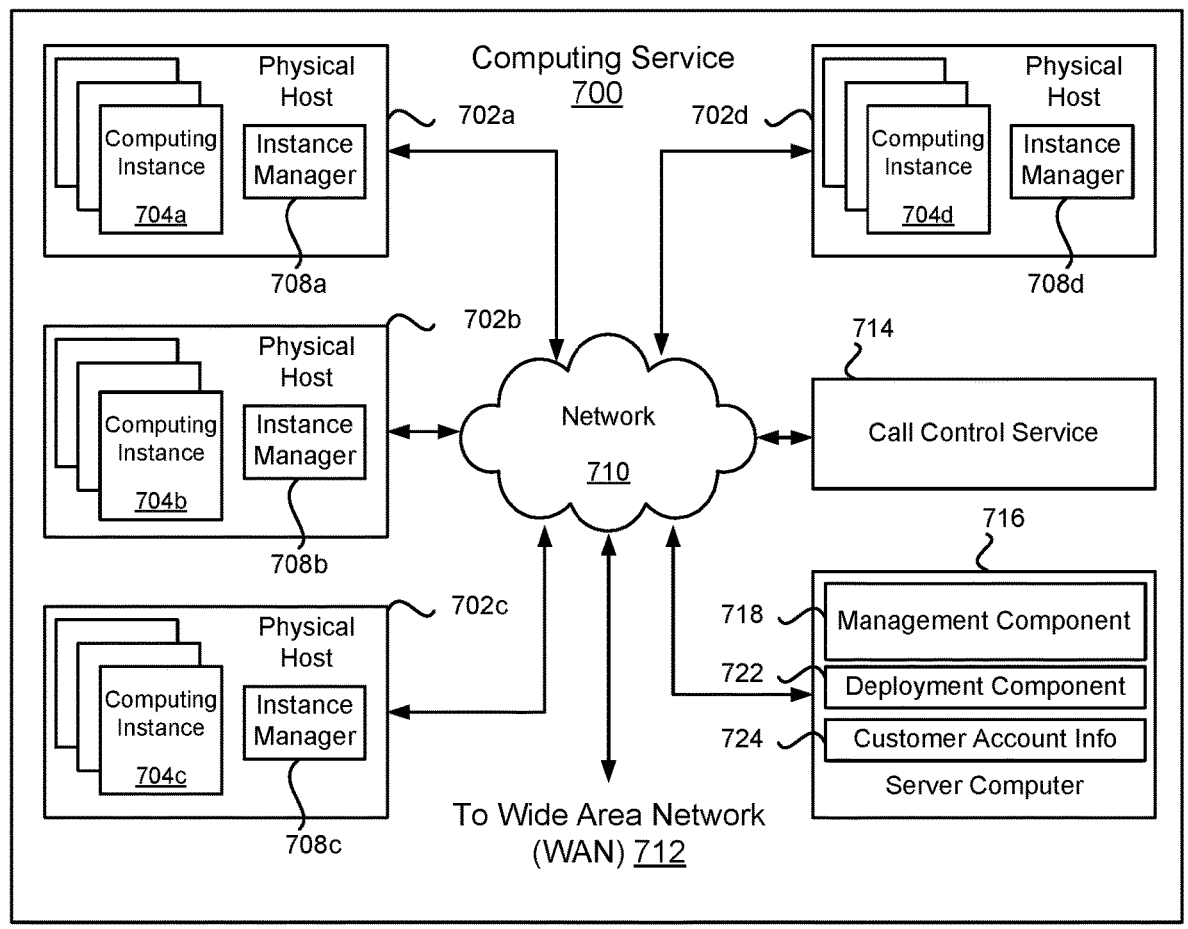
FIG. 7 is a block diagram that illustrates an example computing service environment that includes a call control service.

FIG. 7 is a block diagram illustrating an example computing service 700 that may be used to execute and manage a number of computing instances 704*a-d*. In particular, the computing service 700 depicted illustrates one environment in which the technology described herein may be used. The computing service 700 may be one type of environment that includes various virtualized service resources that may be used, for instance, to host computing instances 704*a-d*.

The computing service 700 may be capable of delivery of computing, storage and networking capacity as a software service to a community of end recipients. In one example, the computing service 700 may be established for an organization by or on behalf of the organization. That is, the computing service 700 may offer a "private cloud environment." In another example, the computing service 700 may support a multi-tenant environment, wherein a plurality of users may operate independently (i.e., a public cloud environment). Generally speaking, the computing service 700 may provide the following models: Infrastructure as a Service ("IaaS"), Platform as a Service ("PaaS"), and/or Software as a Service ("SaaS"). Other models may be provided. For the IaaS model, the computing service 700 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 700. End users may access the computing service 700 using networked client devices, such as desktop computers, laptops, tablets, smartphones, etc. running web browsers or other lightweight client applications, for example. Those familiar with the art will recognize that the computing service 700 may be described as a "cloud" environment.

The particularly illustrated computing service 700 may include a plurality of server computers 702*a-d*. While four server computers are shown, any number may be used, and large data centers may include thousands of server computers. The computing service 700 may provide computing resources for executing computing instances 704*a-d*. Computing instances 704*a-d* may, for example, be virtual machines. A virtual machine may be an instance of a software implementation of a machine (i.e. a computer) that executes applications like a physical machine. In the example of a virtual machine, each of the server computers 702*a-d* may be configured to execute an instance manager 708*a-d* capable of executing the instances. The instance manager 708*a-d* may be a hypervisor, virtual machine monitor (VMM), or another type of program configured to enable the execution of multiple computing instances 704*a-d* on a single server. Additionally, each of the computing instances 704*a-d* may be configured to execute one or more applications, such as the call control service 714 described earlier. Alternatively, the call control service may be executed on a server computer 714.

One or more server computers 716 may be reserved to execute software components for managing the operation of the computing service 700 and the computing instances 704*a-d*. A server computer 716 may execute a management component 718. A user may access the management component 718 to configure various aspects of the operation of the computing instances 704*a-d* purchased by a user. For example, the user may setup computing instances 704*a-d* and make changes to the configuration of the computing instances 704*a-d*.

A deployment component 722 may be used to assist users in the deployment of computing instances 704*a-d*. The deployment component 722 may have access to account information associated with the computing instances 704*a-*

*d*, such as the name of an owner of the account, credit card information, country of the owner, etc. The deployment component 722 may receive a configuration from a user that includes data describing how computing instances 704*a-d* may be configured. For example, the configuration may include an operating system, provide one or more applications to be installed in computing instances 704*a-d*, provide scripts and/or other types of code to be executed for configuring computing instances 704*a-d*, provide cache logic specifying how an application cache should be prepared, and other types of information. The deployment component 722 may utilize the user-provided configuration and cache logic to configure, prime, and launch computing instances 704*a-d*. The configuration, cache logic, and other information may be specified by a user accessing the management component 718 or by providing this information directly to the deployment component 722.

User account information 724 may include any desired information associated with a user of the multi-tenant environment. For example, the user account information may include a unique identifier for a user, a user address, billing information, licensing information, customization parameters for launching instances, scheduling information, etc. As described above, the user account information 724 may also include security information used in encryption of asynchronous responses to API requests. By "asynchronous" it is meant that the API response may be made at any time after the initial request and with a different network connection.

A network 710 may be utilized to interconnect the computing service 700 and the server computers 702*a-d*, 716. The network 710 may be a local area network (LAN) and may be connected to a Wide Area Network (WAN) 712 or the Internet, so that end users may access the computing service 700. The network topology illustrated in FIG. 7 has been simplified, many more networks and networking devices may be utilized to interconnect the various computing systems disclosed herein.

Figure 8:
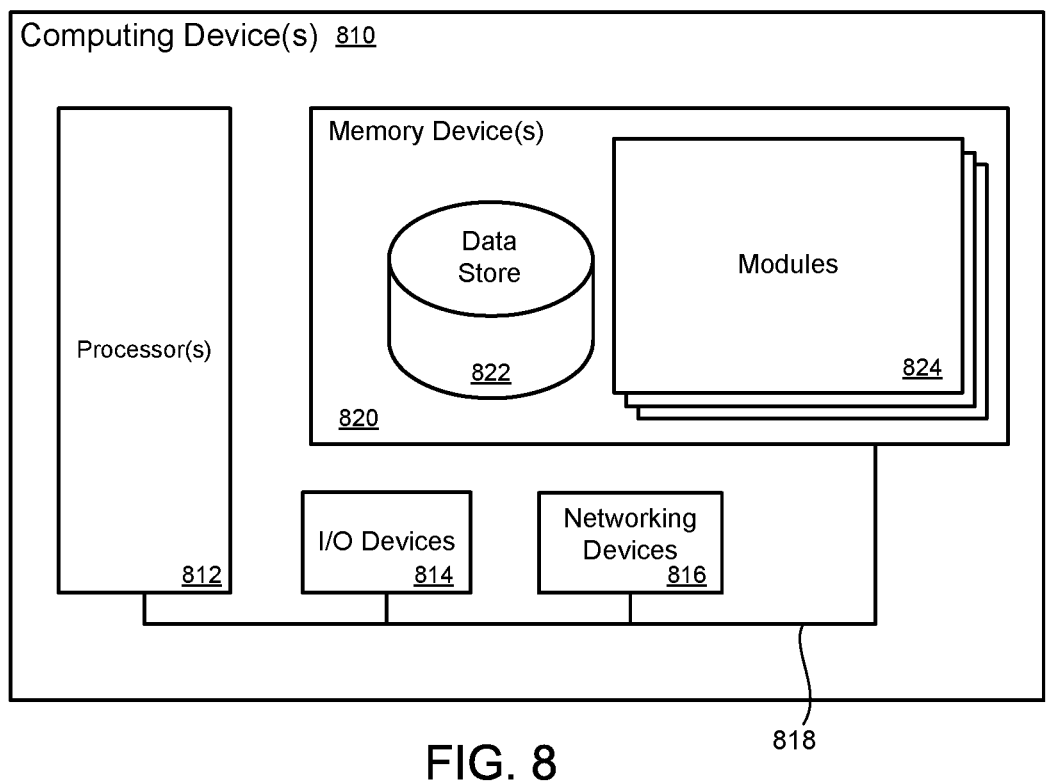
FIG. 8 is block diagram illustrating an example of a computing device that may be used to execute a call control service.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. The modules 824 may execute the functions described earlier. For example, the modules 824 may execute a call control service, a natural language service, a text-to-speech service, as well as other services. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high-level programming languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:
   at least one processor; and
   a memory device including instructions that, when executed by the at least one processor, cause the system to:
   receive, via a content designer user interface (UI) hosted in a service provider environment and from a device associated with a call recipient:
   a first priority designation of a first type for a first caller and a second priority designation of a second type, different than the first type, for a second caller;
   a first interactive agent assigned to the first priority designation and a second interactive agent assigned to the second priority designation; and
   a subject matter associated with calls;
   receive a call at a call control service hosted in the service provider environment, wherein the call control service is managed by a computing service provider;
   identify the first caller and the call recipient using addressing information for the call, wherein the call recipient is registered with the call control service;
   determine that the call is associated with the subject matter and that the call recipient is unavailable to receive the call;
   obtain, from an agent linking profile that includes priority designations assigned to callers by the call recipient, the first priority designation assigned to the first caller;
   identify the interactive agent linked to the subject matter and the first priority designation assigned to the first caller, wherein the interactive agent is to provide a virtual call assistant personalized to the subject matter and the first priority designation assigned to the first caller; and
   invoke the interactive agent linked to the subject matter and the first priority designation.

2. The system as in claim 1, wherein the memory device includes instructions that, when executed by the processor, cause the system to further:
   receive an action identifier for a call option selected by the first caller as returned by the interactive agent to the call control service; and
   invoke a second interactive agent to initiate an action associated with the action identifier.

3. The system as in claim 1, wherein the interactive agent is configured to interface with a messaging service indicated by a call option selected by the first caller to send a message from the first caller to the call recipient.

4. The system as in claim 1, wherein the first interactive agent is configured to initiate a calendar service indicated by a call option selected by the first caller to schedule a meeting with the first caller and the call recipient.

5. A computer implemented method comprising:
   identifying a caller and a call recipient for a call received at a call control service, wherein the call control service is hosted in a service provider environment managed by a computing service provider;
   obtaining, via an agent linking profile in which the call recipient has previously assigned one or more priority designations to one or more callers, a priority designation assigned to the caller;

identifying an interactive agent linked to the priority designation assigned to the caller, wherein the interactive agent is user configurable via a content designer user interface (UI) hosted in the service provider environment to provide a virtual call assistant personalized to the priority designation assigned to the caller; and invoking the interactive agent linked to the priority designation.

6. The method as in claim 5, wherein the agent linking profile includes the one or more priority designations obtained from a company directory.

7. The method as in claim 5, further comprising:
referencing a meeting calendar associated with the call recipient to determine whether the call recipient is available to receive the call;
referencing a communications channel associated with the call recipient to determine whether the communications channel is being utilized indicating that the call recipient is available to receive the call; or
determining that the call recipient is unavailable to receive calls associated with a specified priority designation.

8. The method as in claim 5, wherein the interactive agent is configured to send a message to the call recipient in response to the caller selecting a call option to exchange messages using the interactive agent, wherein the interactive agent:
sends speech input from the caller to a natural language service and provides text of the speech input to the call recipient; and
sends text input provided by the call recipient to a text-to-speech service and provides speech audio to the caller via a client device.

9. The method as in claim 5, wherein the interactive agent is configured to send a message based on a determination that the caller selects a call action to exchange SMS (Short Message Service) messages or MMS (Multimedia Messaging Service) messages with the call recipient.

10. The method as in claim 5, wherein the interactive agent is configured to schedule a meeting in response to the caller selecting a call option to schedule a time for another call.

11. The method as in claim 10, further comprising:
prompting the caller for a meeting time;
referencing a meeting calendar associated with the call recipient to determine whether the call recipient is available during the meeting time; and
adding an invitation for the meeting time to the meeting calendar.

12. The method as in claim 10, further comprising:
determining a meeting time based on the priority designation of the caller; and
providing the meeting time to the caller.

13. The method as in claim 5, further comprising:
prompting the caller for information related to the call using the interactive agent;
evaluating the information to determine a priority of the call; and
identifying a call option associated with the priority of the call.

14. The method as in claim 5, wherein the call is routed to the call control service from a Public Switched Telephone Network (PSTN) or a Voice over Internet Protocol (VoIP) network.

15. The method as in claim 5, wherein the interactive agent is hosted in the service provider environment, a private user network, or a user data center located on user premises.

16. The method as in claim 5, wherein the call control service invokes the interactive agent using an API (Application Programming Interface) or a program code function.

17. A non-transitory machine readable storage medium having instructions embodied thereon, the instructions, when executed by one or more processors, causing the one or more processors to:
identify a caller and a call recipient using addressing information for a call routed to a call control service hosted in a service provider environment, wherein the call control service is managed by a computing service provider;
determine at least one of a topic or a subject matter of the call and that the call recipient is unavailable to receive the call;
obtain, from an agent linking profile, a priority designation assigned to the caller and a reference to an interactive agent linked to the priority designation and the at least one of the topic or the subject matter of the call, wherein the interactive agent is user configurable via a content designer user interface (UI) hosted in the service provider environment to provide a virtual call assistant personalized to the priority designation assigned to the caller; and
invoke the interactive agent linked to the priority designation using the reference, wherein the interactive agent is configured to provide call options and dialog associated with the call options to the caller using a natural language service and to initiate call actions linked to the call options.

18. The non-transitory machine readable storage medium in claim 17, wherein the instructions when executed by the one or more processors further cause the one or more processors to register the agent linking profile with the call control service, wherein calls addressed to a user associated with the agent linking profile are handled based on priority designations assigned to callers specified in the agent linking profile.

19. The non-transitory machine readable storage medium in claim 17, wherein the instructions when executed by the one or more processors further cause the one or more processors to register interactive agents with the call control service, wherein the interactive agents are linked to priority designations assigned to callers in agent linking profiles.

20. The non-transitory machine readable storage medium in claim 17, wherein the interactive agent is created and configured by a user of the computing service provider via the content designer UI that includes visual tools for creating and displaying interactive agent files for the interactive agent.

* * * * *